United States Patent [19]

Lim et al.

[11] Patent Number: 5,313,284
[45] Date of Patent: May 17, 1994

[54] TENSION BAND AND CATHODE RAY TUBE FASTENED THEREWITH

[75] Inventors: Hveong-sub Lim, Pusan; Young-min Hwang, Kyungsangnam, both of Rep. of Korea

[73] Assignee: Samsung Electron Devices Co., Ltd., Kyunggi, Rep. of Korea

[21] Appl. No.: 585,788

[22] Filed: Sep. 20, 1990

[30] Foreign Application Priority Data

Sep. 20, 1989 [KP] D.P.R. of Korea ........... 89-13714[U]
Jun. 2, 1990 [KP] D.P.R. of Korea ................ 90-8165

[51] Int. Cl.$^5$ ............................................. H04N 5/65
[52] U.S. Cl. ..................................... 348/822; 348/818
[58] Field of Search ....................... 358/245, 246, 247; 220/2.1 A, 2.3 A, 319; 313/477 R; 445/8; 524/494

[56] References Cited

U.S. PATENT DOCUMENTS

| | | | |
|---|---|---|---|
| 3,647,960 | 3/1972 | Takemoto et al. | 358/245 |
| 4,243,462 | 1/1981 | Hori et al. | 156/332 |
| 4,332,329 | 6/1982 | Scriven et al. | 358/245 |
| 4,432,018 | 2/1984 | Futatsudera et al. | 358/246 |

*Primary Examiner*—Edward L. Coles, Sr.
*Assistant Examiner*—Thomas D. Lee
*Attorney, Agent, or Firm*—Cushman, Darby & Cushman

[57] ABSTRACT

A tension band for fastening a cathode ray tube and a cathode ray tube fastened with the band around the skirt of the panel thereof are disclosed. The band comprises a single band unit having no seam therein and is made of synthetic resin mainly containing polyamide and glass fiber. The content ratio of the polyamide to glass fiber is preferably 3:7 to 7:3. Before the band is mounted on the cathode ray tube, the ratio of the inner circumference of the tension band as against the outer circumference of the skirt of the panel is preferably 98.79–99.90%. The tension band is easy to manufacture and place on the cathode ray tube, effectively preventing crack expansion and implosion of the cathode ray tube.

13 Claims, 3 Drawing Sheets

TENSION BAND AND CATHODE RAY TUBE FASTENED THEREWITH

FIELD OF THE INVENTION

The present invention relates to an implosion-prevention band and a cathode ray tube fastened therewith, and particularly to a tension band made with improved materials and structure and a cathode ray tube with which it is used.

BACKGROUND OF THE INVENTION

Generally, a tension band for a cathode ray tube is placed tightly around the skirt of the facepanel of the tube to prevent the implosion of the tube. The band functions by restraining the expansion of cracks in the facepanel, which appear when strong pressure or shock is exerted on the facepanel and the high vacuum in the tube causes the violent inward scattering of the tube.

As illustrated in FIGS. 1 and 2, a conventional tension band 10 is made of a metal having a high tensile force, with apertures mounting lugs 20 fixed to the corners of the tension band by welding. The tension band 10 is placed tightly around both the skirt of the facepanel 30, i.e., banding portion 32, and the mold match line between the facepanel 30 and a funnel 40, and drawn up to a very high tension. When the tension band is mounted on the cathode ray tube, an adhesive tape 50 made of heat-resistant material is interposed between the tension band 10 and banding portion 32, so that the tension band 10 is affixed to the skirt of the facepanel 30, being spaced apart from the banding portion 32. When the tension band 10 is tightly placed around the skirt of the facepanel, the adhesive tape 50 is employed to prevent the banding portion 32 from directly contacting the tension band 10 which is subjected to heat, since the banding portion is susceptible to heat. Moreover, while the tension band 10 is affixed to the cathode ray tube or while the tube is undergoing implosion, the smooth-surfaced, metallic tension band is securely fastened by adhesive tape 50 to the predetermined portion without being separated from the banding portion 32 of the cathode ray tube. The adaptation of the tension band 10 minimizes the violent scattering of the facepanel caused by the implosion.

However, the conventional tension band system having the aforesaid structure and the cathode ray tube fastened therewith have problems which will be described below. First of all, the tension band is made of metal with high tensile force and affixed to the tube with insulating adhesive tape. The use of these materials results in a high manufacturing cost. Further, intense heat energy is required to obtain thermal expansion of the metallic tension band needed to place the tension band tightly round the skirt of the facepanel. The use of direct flame to obtain the intense heat results in partial deterioration of the tension band. Such deterioration, in turn, weakens the tensile force of the band. In the structure of the band, an arrangement of precise welding devices is necessary to install the mounting lug, which is made by a separate manufacturing process, at each corner of the tension band. In addition, another separate welding device is needed to prepare the tension band in a loop shape. During the tension band manufacturing processes, rigidly controlled precise welding is required, since the width of the seam portion of the metal band has an ultimate influence on the banding strength obtained around the banding portion of the cathode ray tube.

SUMMARY OF THE INVENTION

The present invention is intended to obviate these and other problems of the conventional system.

Accordingly, it is an object of the present invention to provide a cathode ray tube fastened with a tension band having greatly improved materials and structure.

It is another object of the present invention to provide a cathode ray tube fastened with a tension band wherein the inner circumference of the tension band compared with the outer circumference of the panel of the cathode ray tube is properly adjusted to achieve the optimum tensile force of the tension band.

To achieve these and other objects, a tension band according to the present invention, comprises a single band unit having no seam and is made of synthetic resin containing polyamide and glass fiber.

According to another aspect of the present invention, an adhesive means is applied to the inner side of the tension band which is made of synthetic resin containing polyamide and glass fiber.

According to another further aspect of the present invention, there is provided a cathode ray tube fastened with a tension band which comprises a single band unit having no seam and is made of synthetic resin containing polyamide and glass fiber.

BRIEF DESCRIPTION OF THE DRAWINGS

The above objects as well as the advantages of the invention will become more apparent from the following detailed description thereof provided in connection with the attached drawings, in which.

DETAILED DESCRIPTION OF THE PREFERRED EMBODIMENT

Figure 1:
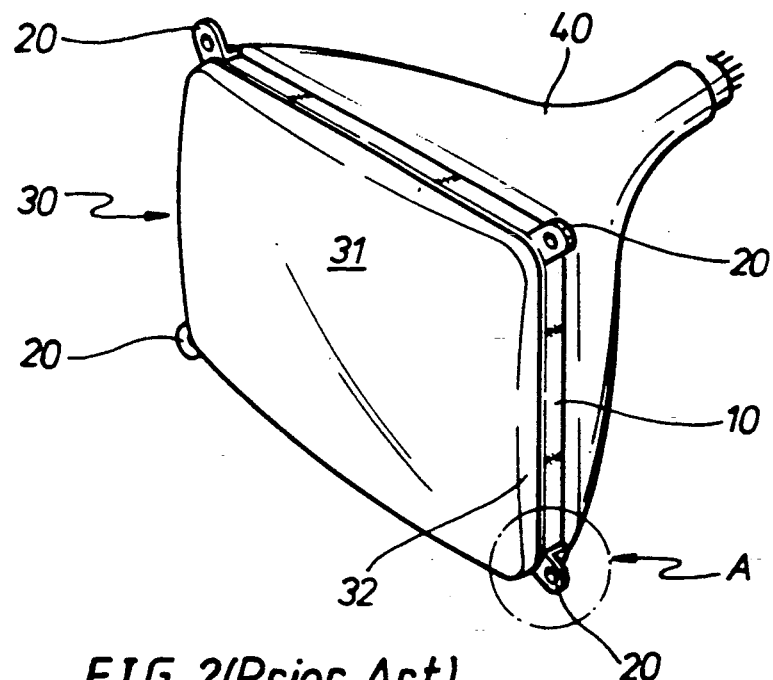
FIG. 1 is a schematic perspective view showing a conventional tension band and a cathode ray tube fastened therewith.
Figure 2:
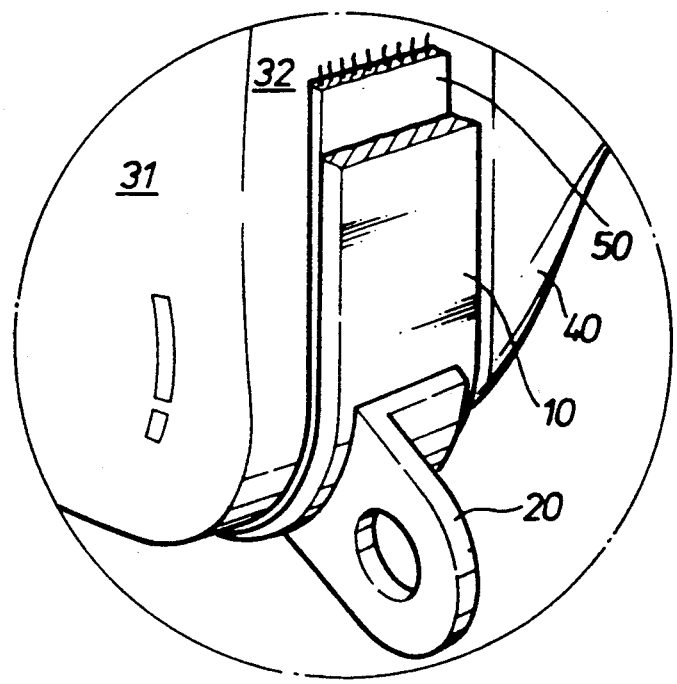
FIG. 2 is a partially enlarged view of the section A of the conventional tension band fastening the cathode ray tube shown in FIG. 1.
Figure 3:
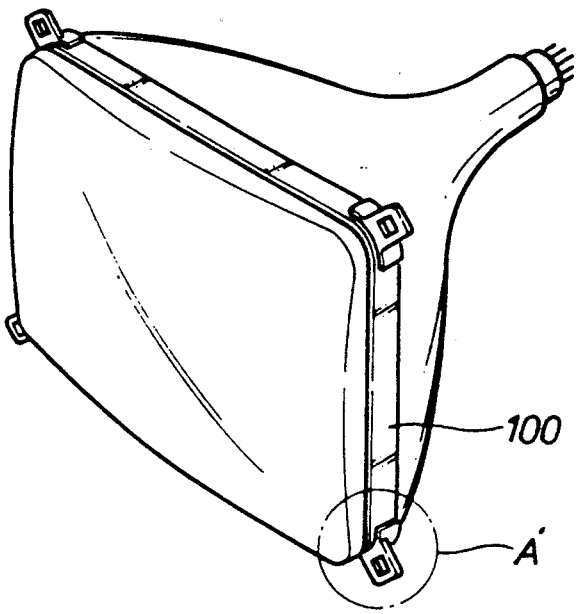
FIG. 3 is a schematic perspective view of one embodiment of a tension band and a cathode ray tube fastened therewith according to the present invention.
Figure 4:
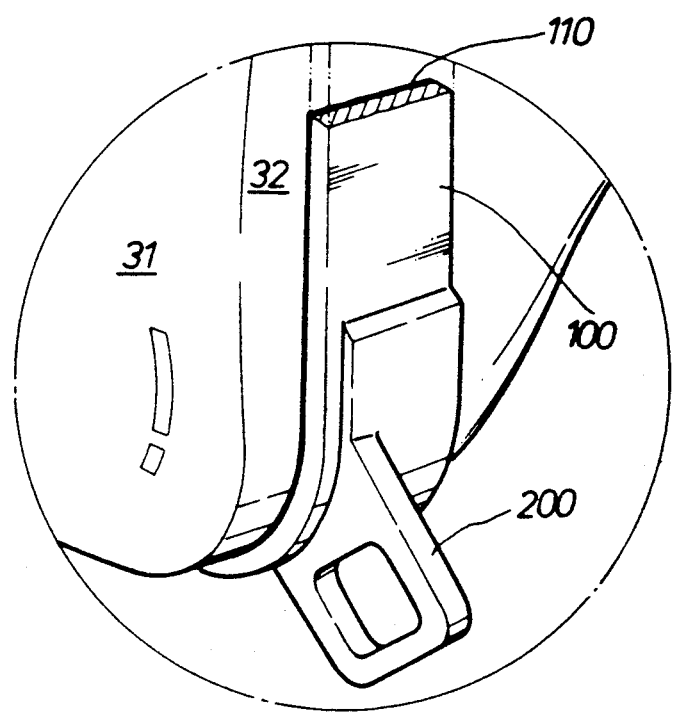
FIG. 4 is a partially enlarged view of section A' shown in FIG. 3.

FIG. 3 illustrate a cathode ray tube fastened with a tension band according to the present invention, and the section A' is illustrated in enlargement in FIG. 4. The tension band 100 according to the present invention is placed tightly around the skirt of a facepanel, i.e., banding portion 32 under very high tensile strength. The tension band 100, is made by injection molding of a kind of engineering plastic material generally containing polyamide (polyamides used might be, for example, polyamide 6 or polyamide 66, among others) of about 70 to 30 percent and glass fiber of about 30 to 70 percent, and is integrally formed with mounting lug 200 at each corner thereof. Alternatively, however, the tension band and the mounting lugs can be separately formed and combined during the process of injection molding the tension band. In manufacturing the tension band, the length of the glass fiber should be about 3–12 mm and the diameter about 6–13 μm. This type of tension band 100 is manufactured by injection molding under high pressure, thereby obtaining a much higher tensile force than 650/cm² which is the minimum requisite tensile force in a tension band of a cathode ray tube, and obtaining as well an elastic recovery rate of within 5%.

And, in view of the co-efficient of thermal expansion, the tensile strength and elastic recovery rate of the material, the ratio of the inner circumference length of the tension band 100 against the outer circumference length of the surface of the banding portion is set in the range of about 99.13–99.79% when the content ratio of the glass fiber is 30%, about 99.13–99.51% when the ratio is 50%, and about 99.51–99.90% when the ratio is 60%.

An adhesive 110, such as ordinary adhesive, epoxy resin or the like, which melts when heated, is applied to the inner side of the tension band which contacts to a banding portion 32 preventing the tension band 100 from sliding on the banding portion. The adhesive 110 melted in solvent is applied in fluid-state to the inner side of the tension band 100, and then solidified. It is preferable that the adhesive become sticky when heated to about 150°–200° C. Alternatively, an adhesive band, made of the same material as the fluid adhesive, may be attached to the inner side of the tension band instead of applying the fluid adhesive.

In order to give a degree of conductivity to the tension band, a conductive substance such as graphite or ferrite can be added to the materials of the tension band, so that the static electricity traveling on the surface of the screen of a cathode ray tube is effectively lowered through an electrical connection of the tension band with a conductive film coating on the surface of the screen.

Figure 5:
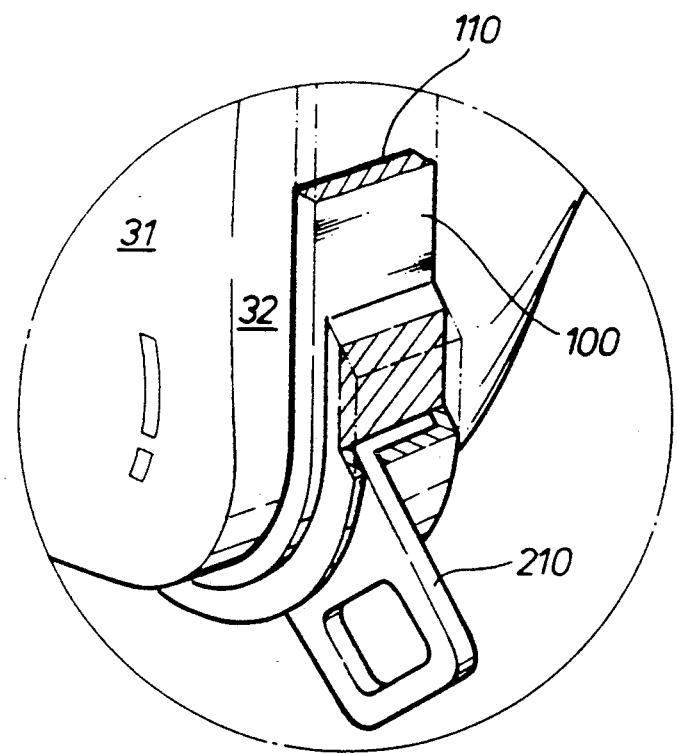
FIG. 5 is an enlarged view of a section of an alternate embodiment of a tension band and a cathode ray tube fastened therewith according to the present invention, which generally corresponds to FIG. 4.

On the other hand, the tension band according to the present invention as illustrated in FIG. 5 can be combined with a metallic or nonmetallic mounting lug 210, separately formed from the tension band, at each corner thereof. The separately formed mounting lug may be incorporated with the tension band during the process of injection molding the tension band. Because of the thermoplastic properties of the band material, an indirect heating method using hot air or heating medium such as hot oil is used to fit the tension band around the cathode ray tube instead of direct heat by flame. Heat is applied indirectly until thermal expansion of the tension band is sufficiently attained at a temperature of about 150°–200° C., at which time the tension band should be tightly fastened around the cathode ray tube without any damage or deformation of the tension band. The heating temperature needs to be kept in the aforesaid range, because a heavy load must be applied to fasten the tension band if the heating temperature is equal to or below 150° C. while, on the other hand, the deformation of the material occurs when the temperature is above 200° C.

When the tension band is placed around the cathode ray tube under the above-mentioned conditions, the adhesive applied to the inner side of the tension band is melted by the heat, and, after being mounted on the banding portion, so that as the melted adhesive cools and solidifies the tension band becomes securely attached to the skirt of the facepanel. An ultrasonic heating method can also be adapted for heating the tension band according to the present invention.

During the process of manufacturing the tension band and the cathode ray tube fastened therewith according to the present invention, the inventors have confirmed that static electricity traveling on the screen is passed through the tension band to the ground, because of the low surface resistance of the nonconductive tension band. But, if a small amount of graphite is added to the materials of the tension band, thus giving the tension band a degree of conductivity, the elimination of the static electricity on the surface of the screen was improved. The tension band according to the present invention is relatively soft and the heat-conductivity is lower than that of a metallic band, so that the conventional adhesive tape is not essentially required. Moreover, because the mounting lug can be integrally molded with the tension band, the separate manufacturing process or welding process of the mounting lug, which were necessary in the conventional art, are not necessarily demanded. Also, the thermal energy required to mount the tension band is much reduced compared with the conventional metallic tension band, thereby bringing about energy saving and a resultant reduction in the cost of manufacturing. The tension band, after being mounted on the cathode ray tube, has a more stable tensile force than any other conventional implosion-prevention band, which partially results from the use of indirect heating by hot air or the ultrasonic method. Indirect heating is an improvement over conventional direct heating flame, because local damage of the material by thermal impact does not occur. Further, in connection with the effect of the implosion-prevention, the tension band according to the present invention is securely affixed to the banding portion of the cathode ray tube and, consequently, the tension band effectively prevents crack expansion and restrains violent inward scattering of the cathode ray tube induced by implosion of the tube.

We claim:

1. A tension band for a cathode ray tube, comprising a single band unit having no seam therein, and being made of synthetic resin containing polyamide and glass fiber, wherein the length of said glass fiber is in the range of 3–12 mm and the diameter thereof is in the range of 6–13 μm.

2. A tension band for a cathode ray tube as claimed in claim 1, wherein the content ratio of said polyamide to glass fiber is about 3:7 to 7:3

3. A tension band for a cathode ray tube as claimed in claim 1, wherein a plurality of mounting lugs are combined with the outer side of said band.

4. A tension band for a cathode ray tube as claimed in claim 3, wherein said mounting lugs are integrally formed with said band.

5. A tension band for a cathode ray tube as claimed in claim 3, wherein said mounting lugs are separately made of metallic or nonmetallic material, and are embedded in the outer side of said band.

6. A tension band for a cathode ray tube, comprising a single band unit having no seam therein, wherein said band is made of synthetic resin containing polyamide and glass fiber, and an adhesive means is provided over the inner side of said band; and wherein conductive material is added to said band material; and wherein said conductive material is graphite or ferrite.

7. A tension band for a cathode ray tube, comprising a single band unit having no seam therein, wherein said band is made of synthetic resin containing polyamide and glass fiber, and an adhesive means is provided over the inner side of said band; wherein the length of said glass fiber is 3-12 mm and the diameter thereof is 6-13 μm.

8. A tension band for a cathode ray tube, comprising a single band unit having no seam therein, wherein said band is made of synthetic resin containing polyamide and glass fiber, and an adhesive means is provided over the inner side of said band; and wherein the content ratio of said polyamide to glass fiber is about 3:7 to 7:3.

9. A tension band for a cathode ray tube, comprising a single band unit having no seam therein, wherein said band is made of synthetic resin containing polyamide and glass fiber, and an adhesive means is provided over the inner side of said band; and wherein a plurality of mounting lugs are combined with the outer said of said band.

10. A tension band for a cathode ray tube as claimed in claim 9, wherein said mounting lugs are integrally formed with said band.

11. A tension band for a cathode ray tube as claimed in claim 9, wherein said mounting lugs are separately made of metallic or nonmetallic material, and are embedded in the outer side of said band.

12. A cathode ray tube comprising a panel having a skirt thereof, wherein the skirt portion of the panel is fastened with a tension band as set forth in any one of claims 6, 7, 8, and 9.

13. A cathode ray tube as claimed in claim 12, wherein the inner circumference of said tension band as against the outer circumference of the skirt of the panel is 98.79-99.90% before said band is mounted in the cathode ray tube.

* * * * *